March 1, 1960     E. T. ARMSTRONG     2,926,757
DISC BRAKE
Filed May 11, 1956     2 Sheets-Sheet 1
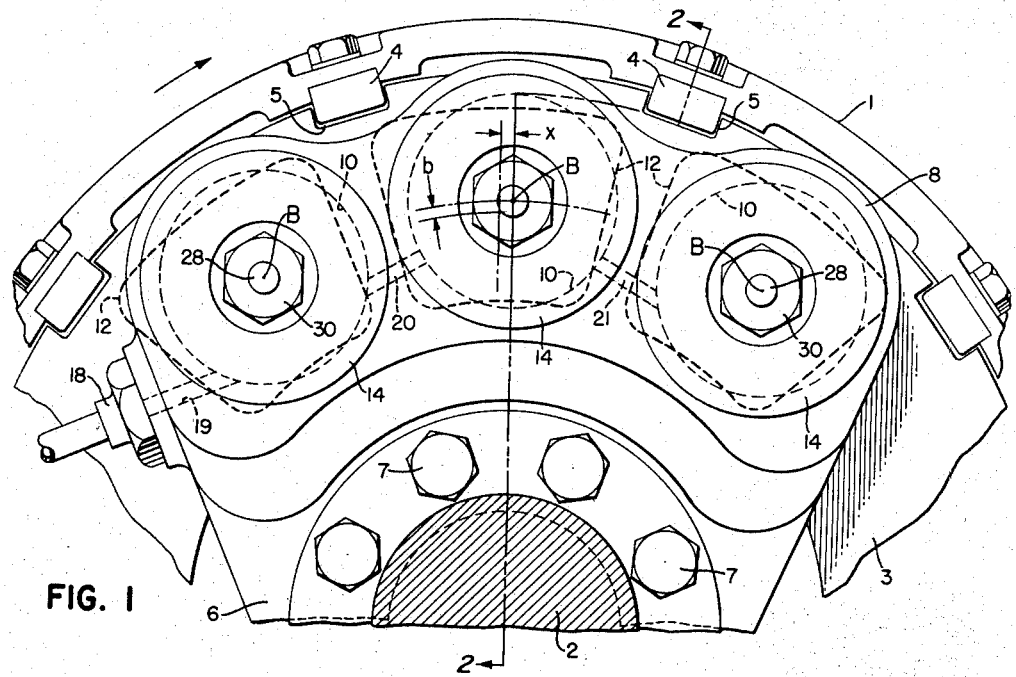
FIG. 1
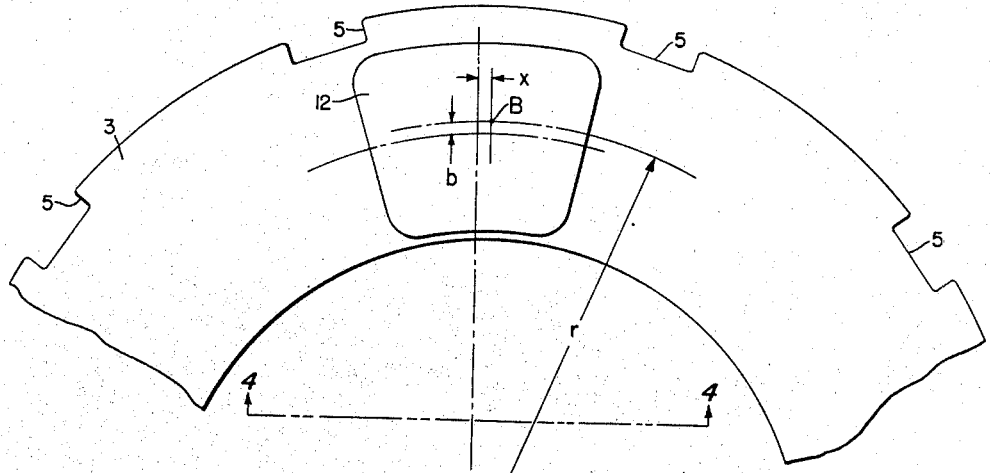
FIG. 3
FIG. 4
INVENTOR.
EDWARD T. ARMSTRONG
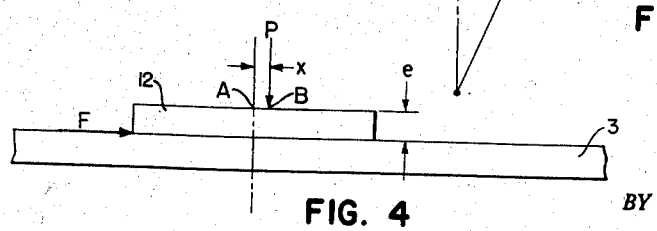
BY
ATTORNEY March 1, 1960

E. T. ARMSTRONG 2,926,757

DISC BRAKE

Filed May 11, 1956

INVENTOR.
EDWARD T. ARMSTRONG

BY

ATTORNEY

United States Patent Office 2,926,757
Patented Mar. 1, 1960

2,926,757

DISC BRAKE

Edward T. Armstrong, Butler, N.J., assignor to The Goodyear Tire & Rubber Company, Akron, Ohio, a corporation of Ohio Application May 11, 1956, Serial No. 584,299

6 Claims. (Cl. 188—73)

This invention relates to friction brakes, especially for use on wheeled vehicles such as aircraft. The invention is especially useful in the design of disc brakes in which a rotatable disc is carried by a wheel and brake shoes mounted on a nonrotatable support or tube engage with the disc to apply friction.

On brakes of this type heretofore proposed difficulties were encountered in that pressure was not applied equally over the braking surfaces resulting in non-uniform wear of the brake shoes and uneven heating of the discs accompanied by distortion of the disc by heat.

It is an object of the present invention to overcome the foregoing and other difficulties by so mounting the brake shoes and applying pressure thereto that forces and moments tending to displace the brake shoes are balanced while retaining a desirable uniformity of interfacial pressure.

It is an object of the invention to tangentially position the point of brake lining load application to compensate for the moments induced by the frictional force with the objective of increasing the uniformity of the local lining-disc contact pressure over the surface of the contact.

Another object is to position the point of load application radially to improve the radial uniformity of lining-disc pressure and thereby of disc-surface temperature in any radial section, and to distribute the lining area about this loading point so as to improve the uniformity of disc heating and to minimize and make more uniform the lining wear. These and other objects will appear from the following description and the accompanying drawings.

Of the drawings:

Fig. 1 is an end elevation of a wheel and brake assembly with the axle shown in section.

Fig. 3 is a diagram of the brake disc and brake shoe.

Fig. 4 is a view taken on line 4—4 of Fig. 3.

Figure 2:
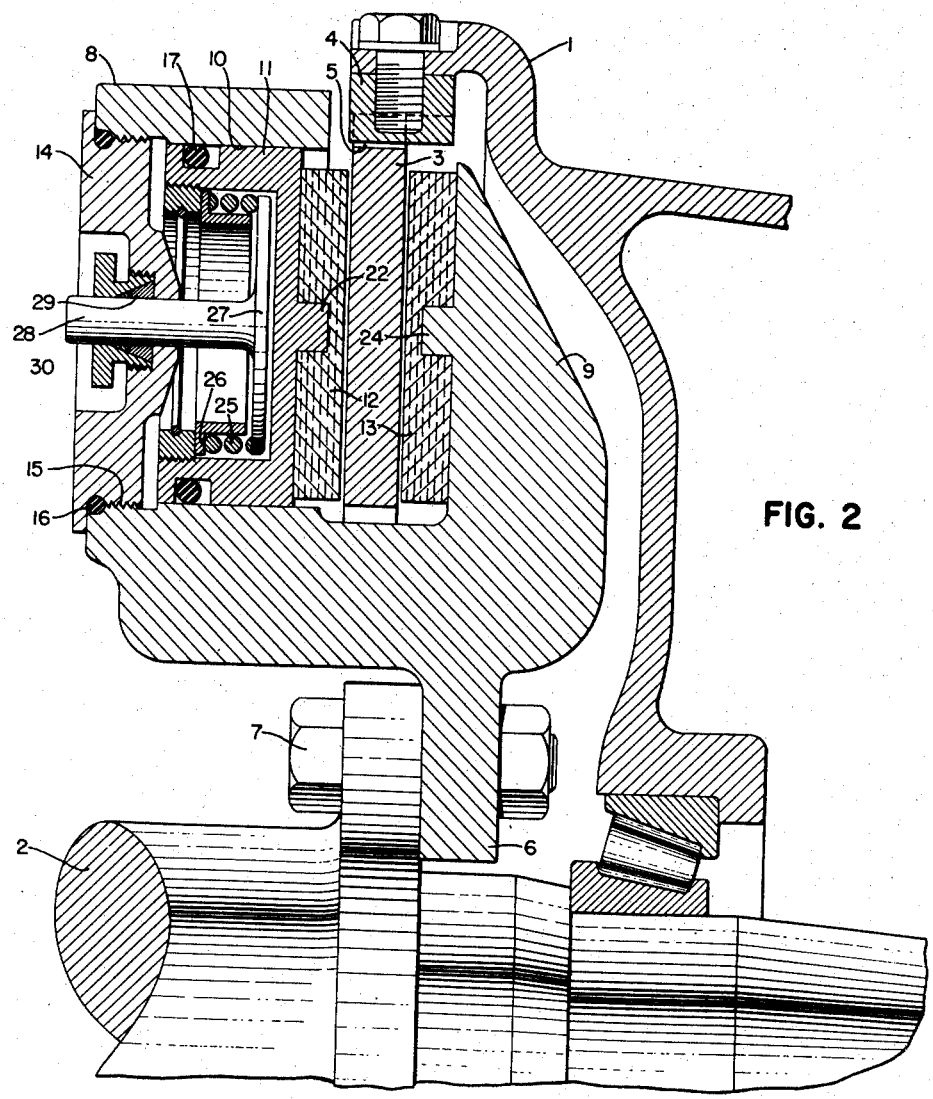
Fig. 2 is a cross-section thereof taken on line 2—2 of Fig. 1.

Referring to the drawings, the numeral 1 designates a wheel mounted for free rotation about an axle 2.

A brake disc 3 is carried by the wheel and may move axially relative thereto by virtue of being suspended upon keys 4 carried by the wheel and engaging slots 5 in the outer periphery of the disc.

For supporting the nonrotative brake members, a support 6 is secured to the axle 2, as by bolts 7. The support has a bifurcated portion having opposed members 8, 9 at opposite faces of the disc 3. One of these members 8 is formed with one or more cylinders 10 having their axes parallel to the axle 2 and provided with pistons 11 slidably mounted therein for supporting brake shoes 12. Opposite the shoes 12, similar brake shoes 13 are mounted upon the member 9. The cylinders 10 are closed at the rear ends by cylinder heads 14 having threaded engagement with the cylinders as at 15 and sealed thereto by a sealing ring 16. The piston 11 is provided with a sealing ring 17. For forcing the piston 11 toward the brake disc 3, a hydraulic pressure fluid connection 18 is provided on the support 6 and connects to a cylinder 10 by way of a passage 19. Other passages 20, 21 connect the other cylinders 10 to the first cylinder.

Now with reference to Figs. 3 and 4, in Fig. 3, a portion of the rotatable disc 3 is shown in plan or face view and a shoe 12 of the brake lining material is shown as resting thereagainst. Although the shoe 12 may be of any desired shape, it is obvious that in order to provide the greatest area of contact with the brake disc within the arc of contact of the shoe with the disc, the shoe should be of modified sectoral shape with its leading and trailing margins essentially parallel to radii of the disc and its remaining margins arcuate and parallel to the inner and outer peripheries of the disc.

It will also be apparent that should the shoe be fixed against rotation with the disc, there will be one point at which forces tending to rotate the shoe as a result of contact of the shoe with the disc will be balanced and that point will be on an arc concentric with the disc and having a radius $r$, which is equal to the distance from the center of rotation of the disc 3 to a point at which the algebraic sum of all moments tending to cause rotation of the shoe in the plane of its face is zero. The difference between radius $r$ and a radius which separates the disc area into two, concentric, annular, equal areas is the distance $b$.

It will also be apparent, with reference to Fig. 4 that the shoe 12 is constrained by forces exerted at a point on its back surface or otherwise spaced from the friction face about which the shoe tends to oscillate and which is spaced by a distance $e$ from the face of the disc. Consider that the resultant normal forces act at the point A being in the plane of the back of the shoe on the perpendicular to the face of disc 3 which intersects the center of area of the face of the shoe. A force P applied normal to the disc induces a frictional force F parallel to the disc face and tending to force the leading margin of the shoe toward the face of the disc with greater pressure than the trailing margin of the disc and thereby providing greater wear of the leading margin of the shoe. This arises from the necessity for the interfacial pressure to become non-uniform to counteract the moment F.e.

Applicant proposes to select a point B at which the pressure over the shoe may be uniformly distributed or equalized and still counteract the moment F.e., so that wear of the brake shoe will be uniform and so that the shoe may be supported with the least tendency to rotate in the plane of the face of the shoe.

With reference to Fig. 4 where $F$=frictional force at interface,
$P$=force applied to shoe
$\mu$=the coefficient of friction, $F/_P$
$e$=thickness of the shoe, or the radius of the friction face from a point of suspension about which the shoe tends to oscillate.
$x$=distance of the point B aft of the center of area It may be shown that:
The force P induces a frictional force and a moment about the point of load application having a magnitude:

$$M = \mu.P.e.$$

This moment may be counteracted by placing the loading point an amount $b$ defined by $$P \cdot x = \mu P e$$
$$x = \mu \cdot e$$

radius $r$ at which the tendency for the shoe to rotate in the plane of its face about the point B will be zero.

Furthermore, the point B is preferably located on a radius $r$ at which the tendency for the shoe to rotate in the plane of its face about the point B will be zero.

Also, in order to completely develop the improved uniformity of disc surface heating, it is essential to provide in addition to properly positioned point B of load application several other conditions. These include first, a provision of area of lining in each annulus of the lining in proportion with the disc surface area in this annulus. This leads basically to a sectoral-shaped shoe lining as shown in Fig. 3. However, this sector would be appropriate only for $\mu$ independent of velocity. If $\mu$ varied with velocity, then the sector area must be slightly modified as a function of radius to compensate for the effect of velocity on the coefficient of friction.

The method of correcting for velocity effect is as follows:

Suppose that $\mu$ increases with decreasing velocity in an average trend approximated by:

$$\mu = \mu_{r_i}\left[1 - a\frac{(r-r_i)}{r_i}\right]$$

Where $\mu$ is the local coefficient at any radius averaged over the speed range for the brake, at this radius.
$\mu_i$ is the value of $\mu_i$ at the inner edge of the swept annulus.
$a$ is the coefficient for a linear expression which approximates how the coefficient varies with speed.
$r$ is any radius in the swept annulus.
$r_i$ is the inner radius of the swept annulus.

Now, the condition desired is that in any annular region, assuming the pressure is distributed uniformly over the lining face, we wish to have the product $\mu . A$ constant. A is the area of the annulus. Now if $\mu$ is of the form, $$\mu = \mu_{r_i}\left[1 - a\frac{(r-r_i)}{r_i}\right]$$

it is clear that A may be of the form $$A = A_{r_i}\left[1 + b\frac{(r-r_i)}{r_i}\right]$$

Then if $a$ is essentially equal to $b$ the area proportioning will compensate for the effect of velocity on the coefficient of friction. In general, it is necessary to determine the relation $$\mu = \mu_{r_i}\left[1 - a\frac{(r-r_i)}{r_i}\right]$$

experimentally and then adjust A accordingly.

With these corrections, materially improved disc heating, lining wear, and lining life may be achieved.

Now with reference again to Figs. 1 and 2, each of the brake shoe linings 12, 13 is of sectoral shape. The shoe 12 is secured to piston 11 by a stud 22 at the center of the piston. The pad is so located relative to the stud 22 that the center of the stud is aft of the radial center line of the shoe by an amount X as determined heretofore, and the radial center of area of the shoe is offset radially a distance $b$ from the center line of the stud 22 such that it coincides with the center of gravity of the modified shape of the sector as described previously.

The shoe 13 is similarly mounted on a single stud 24 in alignment with stud 22, the shoe 13 being positioned relative to the stud 24 in the same manner as shoe 12 is to stud 22.

Rotation of the wheel is in a clockwise direction as seen in Fig. 1, as indicated therein by the arrow.

Each piston 11 is adapted to be advanced by pressure of hydraulic liquid in its cylinder 10, and is returned to a disc-clearing position, shown in Fig. 2, by a coil spring 25 located between a shoulder 26 of piston 11 and a stop 27 carried by a rod 28. The rod 28 is held to the cylinder head 14 by a friction collar 29 compressed against the rod by a gland nut 30, such a construction being known in the art for providing automatic brake clearance adjustment.

It is essential to this invention that the desired uniformity of pressure distribution be achieved. It is therefore desirable to avoid a frequent complication arising from piston head design. If a typical piston head is used, it will dish under pressure to a convex shape. This will make the lining pressure centrally much higher than that peripherally. This must be avoided by rigidizing the piston. Three methods are feasible. One involves thickening the head to reduce distortion. The second involves machining the negative of the anticipated deflection surface into the head. Then, under load, the head deflects into a plane surface and applies a uniform pressure to the lining. The third involves design of a conical head which is inherently much stiffer than a flat head.

While the invention has been illustrated in connection with one type of brake shoe pressure applying means, the invention is also applicable to other brake applying mechanisms, the invention being in so positioning the brake shoes or linings relative to the load application point and arranging the distribution of the lining area thereabout as to provide uniformity of brake shoe or lining wear and uniform heating of the brake disc.

While a certain representative embodiment and details have been shown for the purpose of illustrating the invention, it will be apparent to those skilled in the art that various changes and modifications may be made therein without departing from the spirit or scope of the invention.

What is claimed is:

1. A brake comprising a rotatable disc, a brake shoe non-rotatably mounted adjacent thereto relative to the axis of rotation of said disc but rotatable in the plane of the disc about a pressure load application point within the braking face of the shoe for frictionally engaging the disc, and means for applying a pressure load to the shoe at the load application point for holding it against the disc, the load application point of said pressure means to said shoe being offset from the center of area of the shoe and being on an arc concentric with the disc and having a radius equal to the distance from the center of rotation to a point at which the algebraic sum of all moments tending to cause rotation of the shoe in the plane of its face at zero.

2. A brake comprising a rotatable disc, a brake shoe nonrotatably mounted adjacent thereto relative to the axis of rotation of said disc but rotatable in the plane of the disc about an axis of support intersecting the braking face of the shoe at a load application point for frictionally engaging the disc, and means for applying a pressure load to the shoe at the load application point for holding it against the disc, the load application point of said pressure means to said shoe being on an arc concentric with the disc and having a radius which is greater by a distance $b$ from a radius whose arc strikes the radial midpoint of the disc, and wherein $b = \mu \cdot e$ with $\mu$ being the coefficient of friction between the shoe and disc and $e$ the distance from the face of the disc to the center of virtual rotation of the shoe face about this point on the normal to the face.

3. A brake comprising a rotatable disc, a brake shoe nonrotatably mounted adjacent thereto relative to the axis of rotation of said disc but rotatable in the plane of the disc about an axis of support intersecting the braking face of the shoe at a load application point for frictionally engaging the disc, and means for applying a pressure load to the shoe at the load application point for holding it against the disc, the load application point of said pressure means to said shoe being on an arc concentric with the disc and having a radius which is greater by a distance $b$ from a radius whose arc strikes the radial midpoint of the disc, and wherein $b = \mu \cdot e$ with $\mu$ being the coefficient of friction between the shoe and disc at the velocity of initial brake application, and $e$ being approximately the thickness of the shoe.

4. A brake comprising a rotatable disc, a brake shoe nonrotatably mounted adjacent thereto relative to the axis of rotation of said disc but rotatable in the plane of the disc about an axis of support intersecting the braking face of the shoe at a load application point for frictionally engaging the disc, and means for applying a pressure load to the shoe at the load application point for holding it against the disc, the load application point of said pressure means to said shoe being offset from the center of area of the shoe and being on an arc concentric with the disc and having a radius equal to the distance from the center of rotation to a point at which the algebraic sum of all moments tending to cause rotation of the shoe in the plane of its face is zero, and is spaced in advance of a radius of said disc bisecting the center of area of said shoe relative to the direction of rotation of the disc to provide equal pressure distribution under operating conditions.

5. A brake comprising a rotatable disc, a brake shoe nonrotatably mounted adjacent thereto relative to the axis of rotation of said disc but rotatable in the plane of the disc about an axis of support intersecting the braking face of the shoe at a load application point for frictionally engaging the disc, and means for applying a pressure load to the shoe at the load application point for holding it against the disc, the load application point of said pressure means to said shoe being on an arc concentric with the disc and having a radius equal to the distance from the center of rotation to a point at which the algebraic sum of all moments tending to cause rotation of the shoe in the plane of its face is zero, and is spaced in advance of a radius of said disc bisecting the included angle of said shoe relative to the direction of rotation of the disc to provide equal pressure distribution under operating conditions, the amount of such aft spacing $x$ being equal to $x=\mu e$ where $e$ is the distance along a normal to the face from the face to the center of virtual rotation of the face, and $\mu$ is the coefficient of friction between the disk and the shoe.

6. A brake comprising a rotatable disc, a brake shoe nonrotatably mounted adjacent thereto relative to the axis of rotation of said disc but rotatable in the plane of the disc about an axis of support intersecting the braking face of the shoe at a load application point for frictionally engaging the disc, and means for applying a pressure load to the shoe at the load application point for holding it against the disc, the load application point of said pressure means to said shoe being outwardly offset radially a distance $b$ from the center of area of the shoe, and wherein $b=\mu \cdot e$ with $\mu$ being the coefficient of friction between the shoe and the disc and $e$ is approximately the thickness of the shoe, and is spaced in advance of a radius of said disc passing through the center of area of said shoe relative to the direction of rotation of the disc to provide equal pressure distribution under operating conditions, the amount of such aft spacing $x$ being equal to $x=\mu e$ where $e$ is approximately the thickness of the shoe, and $\mu$ is the coefficient of friction between the disc and shoe at the average speed and temperature of the disc surface for the given disc shoe material combination.

References Cited in the file of this patent

UNITED STATES PATENTS

| 2,351,041 | Hawley | June 13, 1944 |
| 2,862,580 | Burnett | Dec. 2, 1958 |

FOREIGN PATENTS

| 201,668 | Australia | Apr. 20, 1956 |
| 1,047,807 | France | July 29, 1953 |
| 1,114,784 | France | Apr. 17, 1956 |

UNITED STATES PATENT OFFICE

CERTIFICATE OF CORRECTION

Patent No. 2,926,757  March 1, 1960

Edward T. Armstrong

It is hereby certified that error appears in the printed specification of the above numbered patent requiring correction and that the said Letters Patent should read as corrected below.

Column 2, line 71, beginning with "radius" strike out all to and including "be zero." in line 72, same column.

Signed and sealed this 16th day of August 1960.

(SEAL)
Attest:

KARL H. AXLINE
Attesting Officer

ROBERT C. WATSON
Commissioner of Patents